(No Model.)
E. L. KNIGHT.
SLOW CLOSING VALVE.
No. 319,268. Patented June 2, 1885.
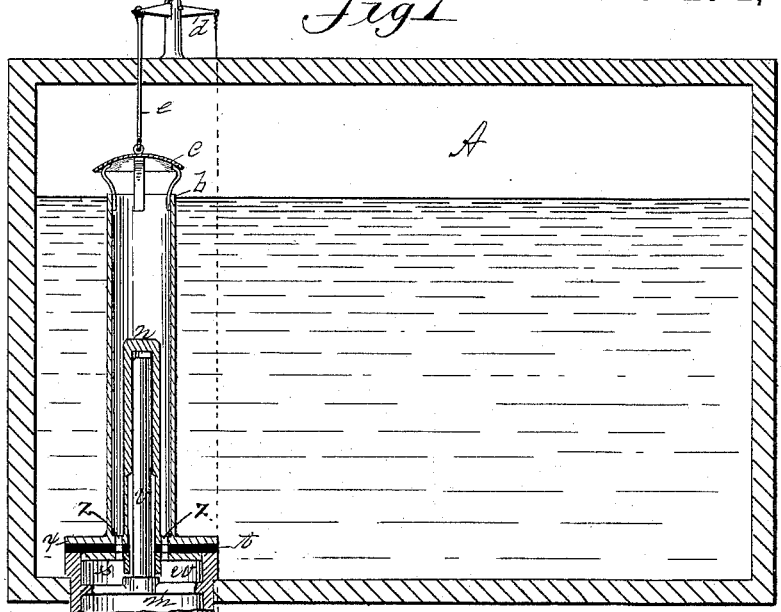
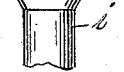
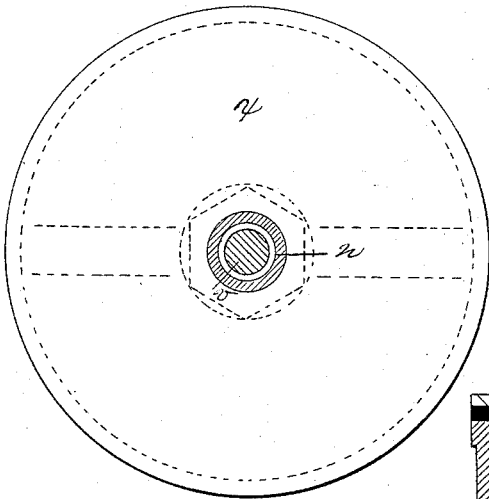
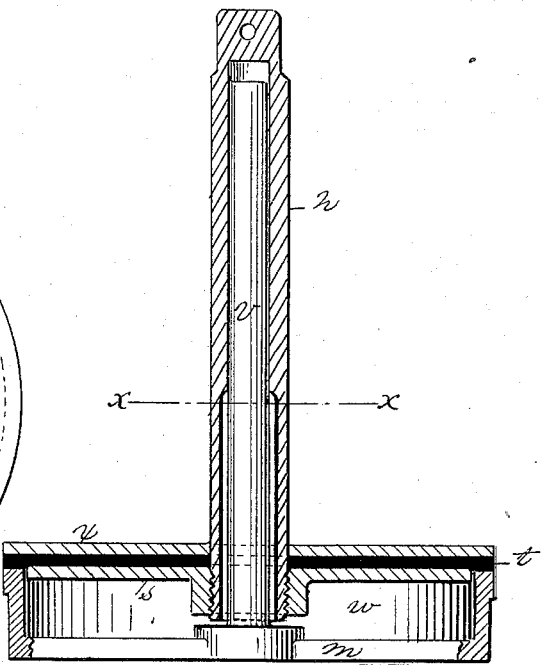
WITNESSES:
J. D. Garfield
C. W. Thompson
INVENTOR
Edwin L. Knight
BY Henry A. Chapin
ATTORNEY

UNITED STATES PATENT OFFICE.

EDWIN L. KNIGHT, OF SPRINGFIELD, MASSACHUSETTS.

SLOW-CLOSING VALVE.

SPECIFICATION forming part of Letters Patent No. 319,268, dated June 2, 1885.

Application filed June 7, 1883. (No model.)

*To all whom it may concern:*

Be it known that I, EDWIN L. KNIGHT, a citizen of the United States, residing at Springfield, in the county of Hampden and State of Massachusetts, have invented new and useful Improvements in Closing-Valves, of which the following is a specification.

This invention relates to improvements in slow-closing valves for water-closet tanks and other purposes where a valve is required, which, when opened, will close automatically and gradually to let water pass through or by it; and it consists in the combination, with the valve-guiding spindle of a valve-seat, of a valve-stem to receive said spindle, having a spindle-chamber of different diameters, the object being to so construct the parts that the valve can be raised to a certain height without creating such a vacuum in the spindle-chamber as will cause the valve to close immediately that it is released, and to provide a suitable water-way between the said spindle and the walls of said stem-chamber to let water flow into and out of said chamber and so produce a proper action of said valve, as hereinafter set forth.

In the drawings forming part of this specification, Figure 2 is a side elevation, partly in section, of a valve constructed according to my invention. Fig. 3 is a plan view showing the spindle and valve-stem in section on line $x$ $x$, Fig. 2. Fig. 1 illustrates the application of my improved valve to a water-closet or other tank.

In the drawings, $w$ is the valve-seat, consisting of a metallic ring having across it at its lower edge the cross-bar $m$, to the center of which is attached the valve-guiding spindle $v$, of cylindrical form. The valve consists of the circular plate $x$, the valve-stem $n$, secured to said plate $x$, and extending far enough beneath the latter to permit of screwing onto it the packing-plate $s$, securing the packing $t$ against the under side of plate $x$, and leaving enough of it exposed to bear upon the edge of the valve-seat $w$ and make a tight joint. The said valve-stem $n$ has its lower end bored out to form that part of the spindle-chamber therein of greater diameter than the spindle $v$, and the upper end of said chamber is made of such diameter as to permit the parts to move freely and easily one on the other. The upper end of the stem $n$ is perforated transversely to provide means for attaching a wire or chain thereto to lift the valve when the latter is set in a tank separate from any overflow-pipe.

In Fig. 1 is illustrated the manner of attaching my improved valve to a water-tank, in connection with an overflow-pipe, $b$. Said pipe $b$ has its lower end securely fixed to the plate $x$ by soldering it or by other suitable means, and the latter has perforations $z$ $z$ made through it around the stem $n$, to let any water which may overflow from the tank A into said pipe run freely through the valve and the pipe $i$, leading therefrom to the water-closet, and thence to the sewer. Pipe $b$ is provided with the usual cap, $c$, set on supports on its upper end, and the usual lever, $d$, is connected by a rod, $e$, therewith, and has a wire connection with the water-closet.

The operation of my improved valve is as follows: By any well known means the valve and chambered valve-stem are attached to devices whereby they are lifted up when it is desired that water may flow from a tank to which they are attached, and said lifting devices are adapted to lift the valve and its stem, and to carry the upper end of the large chamber at the lower part of said stem just above the end of the spindle $v$, and permit the water to flow from the tank through said large chamber into the upper end of the stem $n$. The lifting devices are now released and the weight of the valve is brought upon the water within the stem, which gradually escapes therefrom, forced by said weight, letting the valve fall slowly down and gradually close against the seat $w$, thereby permitting the water to flow through the pipe $i$ during the time occupied in falling. The diameters of the upper ends of the spindle $v$ and the chamber in the stem $n$ may be so adjusted relatively as to let the water in the latter escape faster or slower under the action of the weight of the valve, and thus determine a water-flow of a given length of time.

The construction of the stem $n$ of the valve with the lower end of its spindle-chamber being of greater diameter than its upper end, conduces, first, to overcome the suction effect produced by moving the stem upward upon the spindle, which, if not removed, would cause the valve to quickly regain its seat the instant the lifting devices were released, but as soon as the valve is lifted high enough to carry the end of the large chamber above the end of the spindle $v$ the suction effect aforesaid is inoperative to return the valve to its seat, for the water at once rushes in to fill the vacuum so created; secondly, the larger part of said chamber provides a free water-way, whereby the smaller part can quickly fill up.

What I claim as my invention is—

1. The combination in a tank-valve, of a valve-guiding spindle, and a hollow valve-stem to receive said spindle, having a spindle-chamber largest at and just above its lower end, substantially as set forth.

2. In combination with the tank A and the discharge-pipe $i$, the valve-seat $w$ and spindle $v$, the valve $x$, having the stem $n$ thereon, provided with a spindle-chamber largest at its lower end and having perforations through it near said stem, the overflow-pipe $b$, secured to said valve, and suitable means for lifting said pipe and valve, substantially as set forth.

EDWIN L. KNIGHT.

Witnesses:
H. A. CHAPIN,
C. W. THOMPSON.